(12) United States Patent
Tezuka et al.

(10) Patent No.: US 9,968,873 B2
(45) Date of Patent: May 15, 2018

(54) DEVICE FOR CONCENTRATING A FLUID MIXTURE COMPRISING BOTH LIQUID AND SOLID PARTS

(71) Applicant: AMUKON KABUSHIKI KAISHA, Yokohama-shi, Kanagawa (JP)

(72) Inventors: Yusuke Tezuka, Yokohama (JP); Yuki Tsugawa, Yokohama (JP)

(73) Assignee: AMUKON KABUSHIKI KAISHA, Yokohama-Shi, Kanagawa (JP)

( * ) Notice: Subject to any disclaimer, the term of this patent is extended or adjusted under 35 U.S.C. 154(b) by 149 days.

(21) Appl. No.: 14/901,946

(22) PCT Filed: Jul. 8, 2013

(86) PCT No.: PCT/JP2013/068596
§ 371 (c)(1),
(2) Date: Dec. 29, 2015

(87) PCT Pub. No.: WO2015/004707
PCT Pub. Date: Jan. 15, 2015

(65) Prior Publication Data
US 2016/0144304 A1 May 26, 2016

(51) Int. Cl.
*B01D 33/46* (2006.01)
*B01D 33/067* (2006.01)
(Continued)

(52) U.S. Cl.
CPC ......... *B01D 33/466* (2013.01); *B01D 29/46* (2013.01); *B01D 29/70* (2013.01); *B01D 33/067* (2013.01); *B01D 33/275* (2013.01)

(58) Field of Classification Search
None
See application file for complete search history.

(56) References Cited

U.S. PATENT DOCUMENTS 5,380,436 A 1/1995 Sasaki
6,338,411 B1 1/2002 Katabe
(Continued)

FOREIGN PATENT DOCUMENTS

CN 1289266 3/2001
CN 1736695 A 2/2006
(Continued)

*Primary Examiner* — Chester T Barry
(74) *Attorney, Agent, or Firm* — Davidson, Davidson & Kappel, LLC

(57) ABSTRACT

A device for concentrating an object to be treated has a filter body in which a movable plate is disposed between adjacent annular fixed plates, the moveable plate being formed in the same annular shape. Sludge filtrate passes through filtrate inflow gaps between the fixed plates and the movable plate before being caused to flow into the filter body. The movable plate is moved so that solids in the sludge are kept from clogging the filtrate inflow gaps. A cleaning member is caused to rub against the outer peripheral surfaces of the fixed plates so that solids adhering to the outer peripheral surfaces of the fixed plates are scraped off. The movable plates of said device are caused to perform a circular movement by eccentric cams fixed to the shaft. The cleaning member is fixed to the shaft, and caused to rotate around the shaft by the rotation of the shaft so that solids adhering to the outer peripheral surfaces of the fixed plates are scraped off.

10 Claims, 11 Drawing Sheets

(51) Int. Cl.
*B01D 29/46* (2006.01)
*B01D 29/70* (2006.01)
*B01D 33/27* (2006.01)

(56) References Cited

U.S. PATENT DOCUMENTS 7,344,033 B2  3/2008  Sasaki et al.
2001/0050249 A1  12/2001  Izumi

FOREIGN PATENT DOCUMENTS

| | | |
|---|---|---|
| CN | 102887618 A | 1/2013 |
| JP | S60-14915 | 1/1985 |
| JP | 05228695 | 9/1993 |
| JP | 2001-145809 | 5/2001 |
| JP | 2001-321613 | 11/2001 |
| JP | 2004357615 | 12/2004 |
| JP | 4318735 | 8/2009 |
| JP | 2009-213986 | 9/2009 |
| JP | 2013-158739 | 8/2013 |
| SU | 172961 | 6/1964 |
| WO | WO2011001467 | 1/2011 |

[Figure 2]
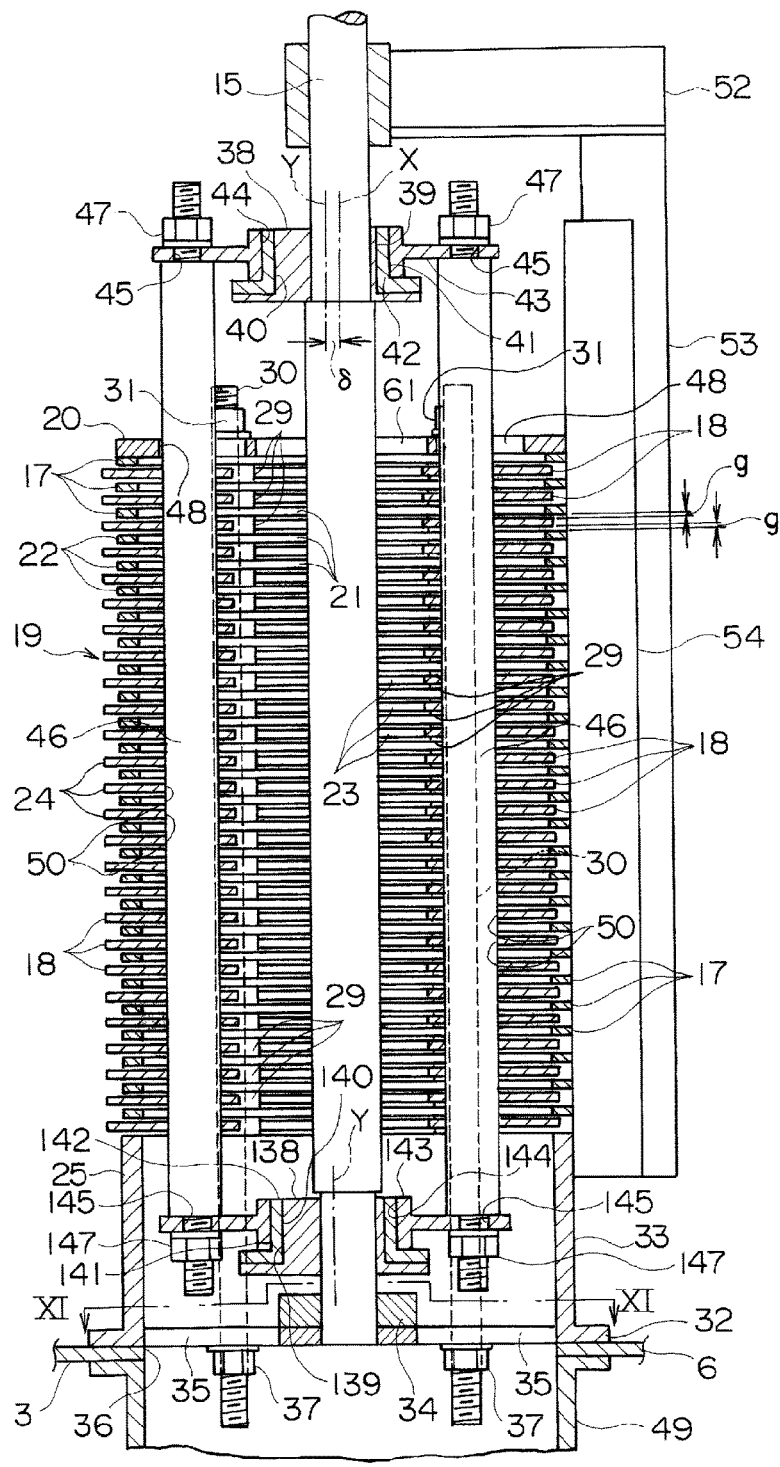

[Figure 3]
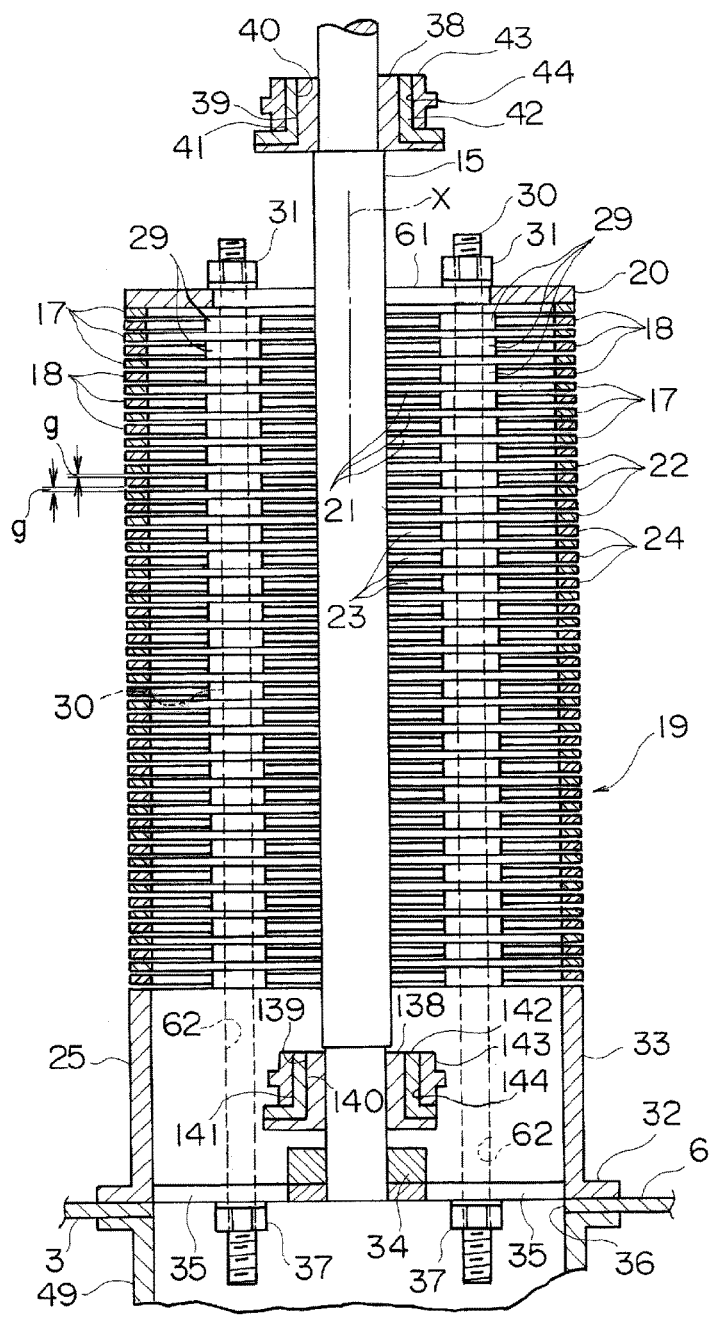

[Figure 4]
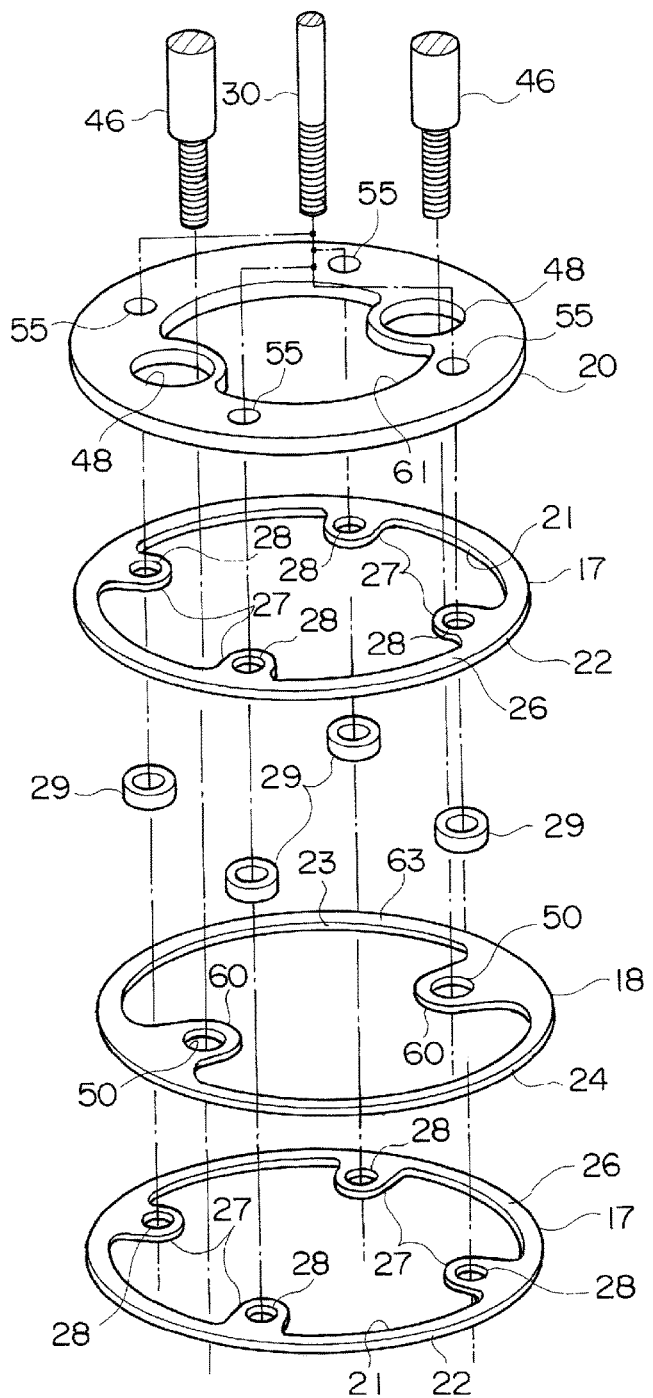

[Figure 5]
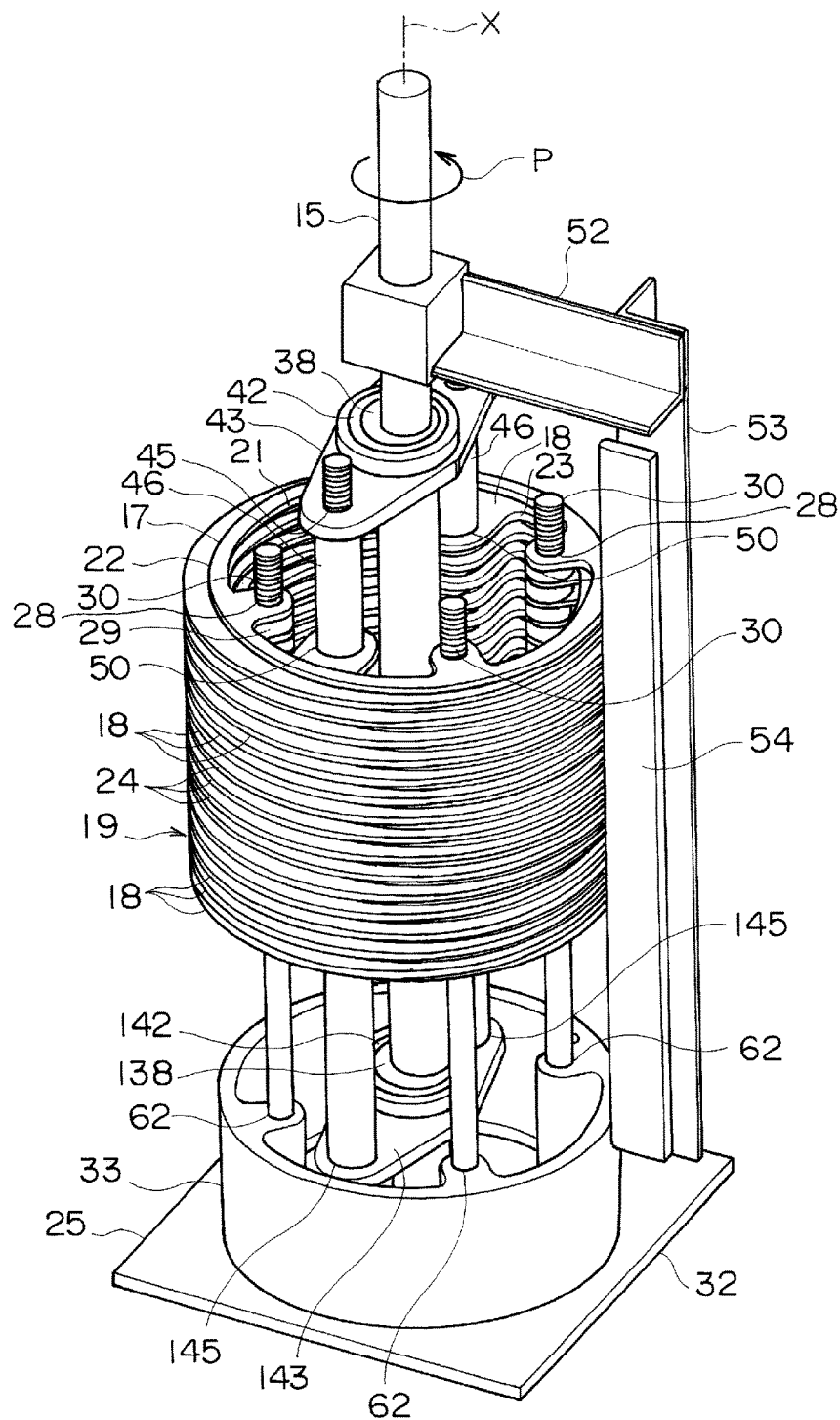

[Figure 6]
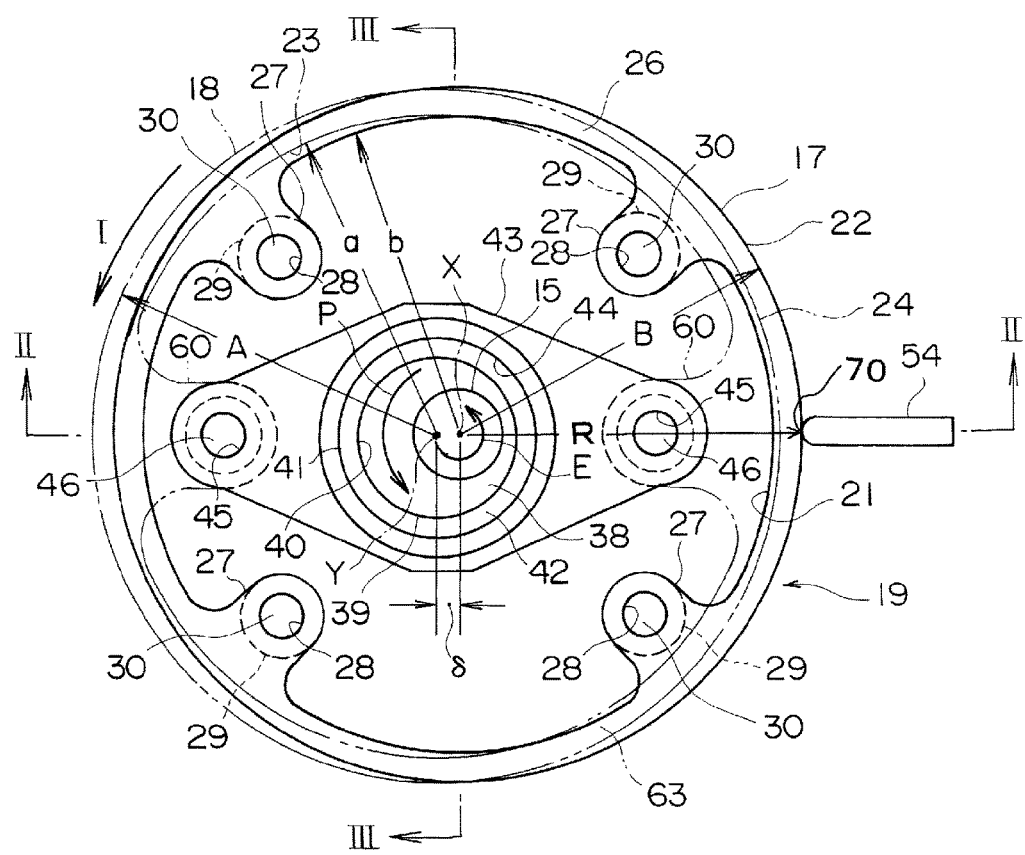

[Figure 7]
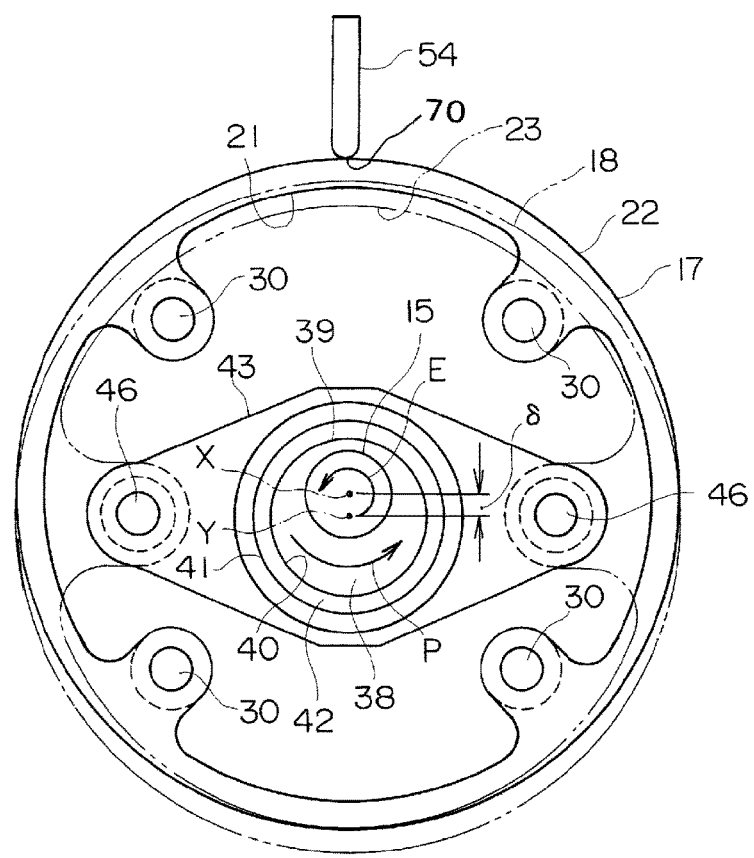

[Figure 8]
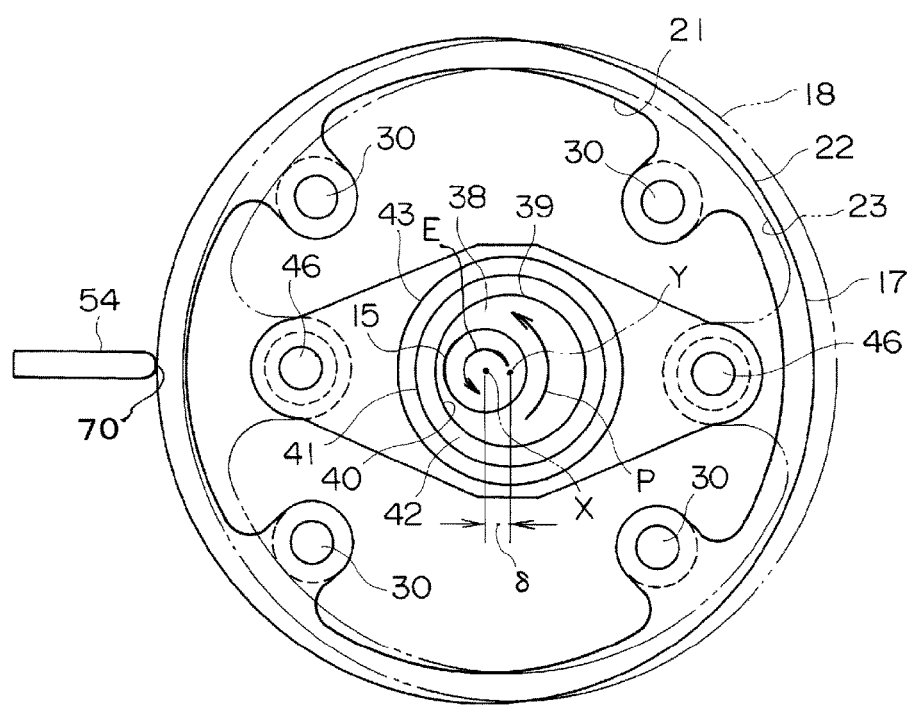

[Figure 9]
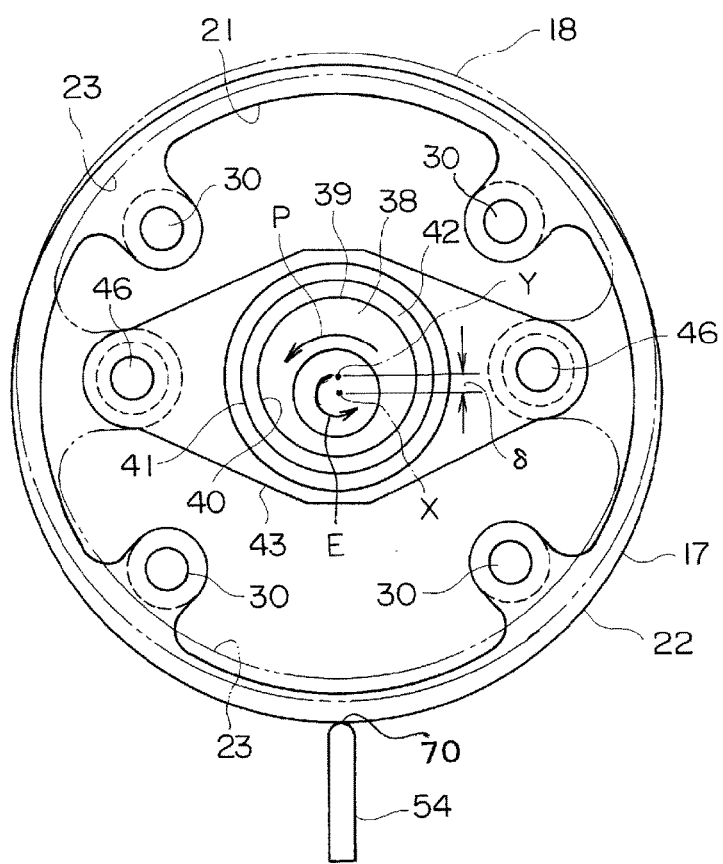

[Figure 10]
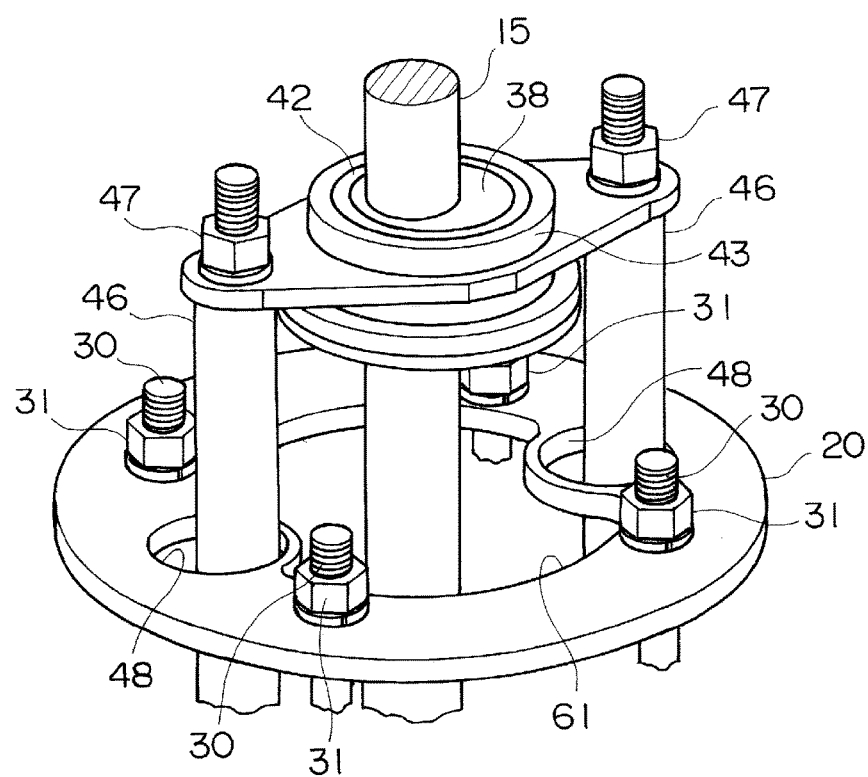

[Figure 11]
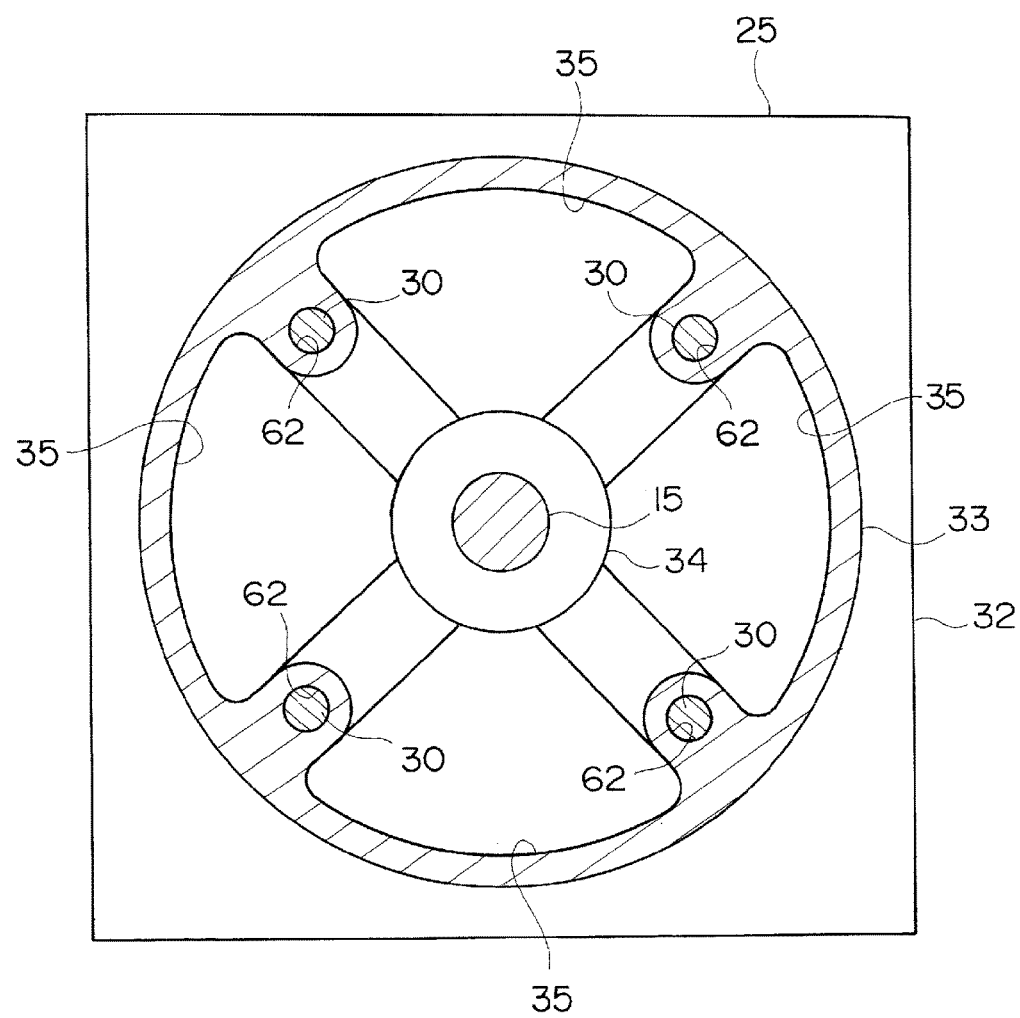

DEVICE FOR CONCENTRATING A FLUID MIXTURE COMPRISING BOTH LIQUID AND SOLID PARTS

The present invention relates to a device for concentrating object to be treated, containing a large amount of liquid prior to solid-liquid separation thereof by a solid-liquid separator.

BACKGROUND

There has conventionally been known a solid-liquid separator for separating the liquid from a liquid-containing object to be treated, including organic sludge such as sewage disposal matters, waste water from a pig farm or the like, food waste crushed by a disposer, vegetable scraps ground into a mush, waste cow milk, waste tofu with added water, and other processed food, sludge obtained by biodegrading such organic sludge, and inorganic sludge such as plating wastes, ink wastes, pigment wastes, and paint wastes (see Japanese Patent Application Laid-open No. H5-228695 and Japanese Patent Application Laid-open No. 2004-357615, for example). The lower the concentration of the solid content of an object to be treated, fed to such solid-liquid separator, the lower the amount of solid content that can be separated from the object to be treated by the solid-liquid separator, resulting in inability to efficiently separate the object to be treated into a solid and liquid.

In dealing with this problem, there has been proposed a device for concentrating object to be treated, prior to separating the object to be treated into a solid and liquid by means of a solid-liquid separator (see Japanese Patent No. 4318735, for example). This type of conventional apparatus for concentrating object to be treated has a mixing tank that receives an object to be treated, containing liquid and a filter body disposed inside the mixing tank. The filter body has fixed plates disposed at intervals and movable plates disposed between adjacent fixed plates. The fixed plates and the movable plates each have a through-hole. Filtrate that is separated from the object to be treated flows into the filter body through filtrate inflow gaps between the fixed and movable plates.

This apparatus also has a cleaning member that presses and shoves the plurality of movable plates while in sliding contact with the outer circumferential surfaces of the plurality of fixed plates. Due to the presence of the cleaning member, the movable plates operate actively between the adjacent fixed plates, preventing clogging of the filtrate inflow gaps between the fixed and movable plates by the solid content of the object to be treated. In addition, the sliding contact between the cleaning member and the outer circumferential surfaces of the fixed plates can prevent the solid content from adhering to the periphery of the filter body. As a result, a large amount of filtrate separated from the object to be treated can be let flow into the filter body efficiently.

However, because the conventional apparatus for concentrating object to be treated is configured such that the cleaning member applies pressure to the movable plates and consequently shoves the movable plates, the cleaning member and the movable plates are brought into pressure-contact with each other by high pressure, possibly resulting in relatively early wear of the movable plates or the cleaning member.

Patent Literature 1: Japanese Patent Application Laid-open No. H5-228695 (JP H05-228695 A)
Patent Literature 2: Japanese Patent Application Laid-open No. 2004-357615 (JP 2004-357615)
Patent Literature 3: Japanese Patent No. 4318735 (JP 4318735 B)

SUMMARY OF THE INVENTION

An object of the present invention is to provide a device for concentrating object to be treated, that is capable of efficiently separating filtrate from an object to be treated, to effectively concentrate the object to be treated and does not need to bring a cleaning member and movable plates into pressure-contact with each other with high pressure, unlike the conventional object to be treated concentration apparatus.

The present invention provides a device for concentrating object to be treated, having: a filter body that has a plurality of fixed plates, each of which has a through-hole and a circular outer circumferential surface and which are disposed at intervals, and movable plates, each of which has a through-hole and is disposed between adjacent fixed plates; a mixing tank that accommodates the filter body and to which an object to be treated, containing liquid is fed; stirring means disposed outside the filter body and stirring the object to be treated fed to the mixing tank; a shaft that extends in the filter body; a drive unit that rotationally drives the shaft; an eccentric cam that is secured to the shaft or formed integrally with the shaft and eccentrically disposed with respect to a central axial line of the shaft; coupling means for coupling the plurality of movable plates and the eccentric cam to each other so that the plurality of movable plates move in a circle, with an eccentricity of the eccentric cam being a radius of the circle; and a cleaning member that is secured and supported on the shaft so as to rotate along with the shaft while in sliding contact with parts of outer circumferential surfaces of the plurality of fixed plates where the movable plates do not protrude outward from the outer circumferential surfaces of the fixed plates in a radial direction of the fixed plates, wherein filtrate that is separated from the object to be treated fed to the mixing tank is made to flow into the filter body through filtrate inflow gaps between the fixed plates and the movable plates, and the resultant object to be treated with a reduced liquid content is made to flow out of the mixing tank through an outlet.

In the device for concentrating object to be treated, described above, it is advantageous that the coupling means have a ring-shaped slide bearing that is engaged with a circular outer circumferential surface of the eccentric cam, a coupling plate that has a circular hole engaged with a circular outer circumferential surface of the slide bearing, and a coupling rod that couples the plurality of movable plates and is coupled to the coupling plate, and that the entire periphery of the circular outer circumferential surface of the eccentric cam be engaged with a circular inner circumferential surface of the slide bearing in a slidable manner.

Furthermore, in the device for concentrating object to be treated, described above, it is advantageous that the coupling means have a ring-shaped slide bearing that is engaged with a circular outer circumferential surface of the eccentric cam, a coupling plate that has a circular hole engaged with a circular outer circumferential surface of the slide bearing, and a coupling rod that couples the plurality of movable plates and is coupled to the coupling plate, and that the entire periphery of the circular outer circumferential surface of the slide bearing be engaged with an inner circumferential surface of the circular hole formed in the coupling plate in a slidable manner.

In the device for concentrating object to be treated, described above, it is advantageous that the coupling means have a coupling plate that has a circular hole engaged with a circular outer circumferential surface of the eccentric cam, and a coupling rod that couples the plurality of movable plates and is coupled to the coupling plate, and that the entire periphery of the circular outer circumferential surface of the eccentric cam be engaged with an inner circumferential surface of the circular hole formed in the coupling plate in a slidable manner.

Moreover, in the device for concentrating object to be treated, described above, it is advantageous that the eccentric cam and the coupling plate be provided at a plurality of sections that are away from one another in a longitudinal direction of the shaft and that the coupling rod be coupled to the plurality of coupling plates.

In the device for concentrating object to be treated, described above, it is advantageous that the fixed plates and the movable plates be formed in such a manner that the movable plates move in a circle while moving in an entire space between annular portions of adjacent fixed plates during one rotation of the shaft.

In the device for concentrating object to be treated, it is advantageous that the fixed plates and the movable plates be formed in a ring shape, that a central axial line of circular through-holes of the movable plates match a central axial line of the eccentric cam, that a central axial line of circular through-holes of the fixed plates match a central axial line of the shaft, and that the fixed plates and the movable plates be formed in such a manner that $a+\delta \leq B$ and $A+\delta \geq b$ are satisfied, where a represents a radius of the through-holes of the movable plates, A represents a radius of outer circumferential surfaces of the movable plates, b represents a radius of the through-holes of the fixed plates, B represents a radius of outer circumferential surfaces of the fixed plates, and $\delta$ represents an eccentricity of the central axial line of the eccentric cam with respect to the central axial line of the shaft.

It is advantageous that the device for concentrating object to be treated have a guide for guiding the movable plates that move in a circle so that the movable plates are prevented from coming into contact with other members by rotating about the central axial line of the shaft.

According to the present invention, the movable plates are not shoved by the cleaning member but are moved in a circle by the eccentric cam that is secured to the shaft that is driven to rotate. This configuration can prevent the cleaning member and the movable plates from coming into pressure-contact with each other with high pressure, preventing early wear of the cleaning member, unlike the conventional device for concentrating object to be treated.

BRIEF DESCRIPTION OF THE DRAWINGS

FIG. 2 is a cross-sectional diagram showing a filter body and components associated therewith, the diagram taken along line II-II of FIG. 6;

FIG. 3 is a cross-sectional diagram showing the filter body and the components associated therewith, the diagram taken along line of FIG. 6;

FIG. 4 is an exploded perspective view showing two adjacent fixed plates, one movable plate disposed between these fixed plates, a guide plate, and some of the components associated to these plates;

FIG. 5 is a perspective view showing the filter body without fixed and movable plates positioned in the lower portion of the filter body as well as some of the components such as the guide plate;

FIG. 6 is a schematic plan view for explaining the movements of the movable plates and the cleaning member without showing the guide plate and the like for the purpose of clarification;

FIG. 7 is a schematic plan view similar to that of FIG. 6, explaining the movements of the movable plates and the cleaning member;

FIG. 8 is a schematic plan view similar to that of FIG. 6, explaining the movements of the movable plates and the cleaning member;

FIG. 9 is a schematic plan view similar to that of FIG. 6, explaining the movements of the movable plates and the cleaning member;

FIG. 10 is a perspective view for explaining how the guide plate, coupling rods, the shaft, stay bolts and the like are assembled; and FIG. 11 is an enlarged cross-sectional diagram taken along line XI-XI of FIG. 2.

DETAILED DESCRIPTION

Figure 1:
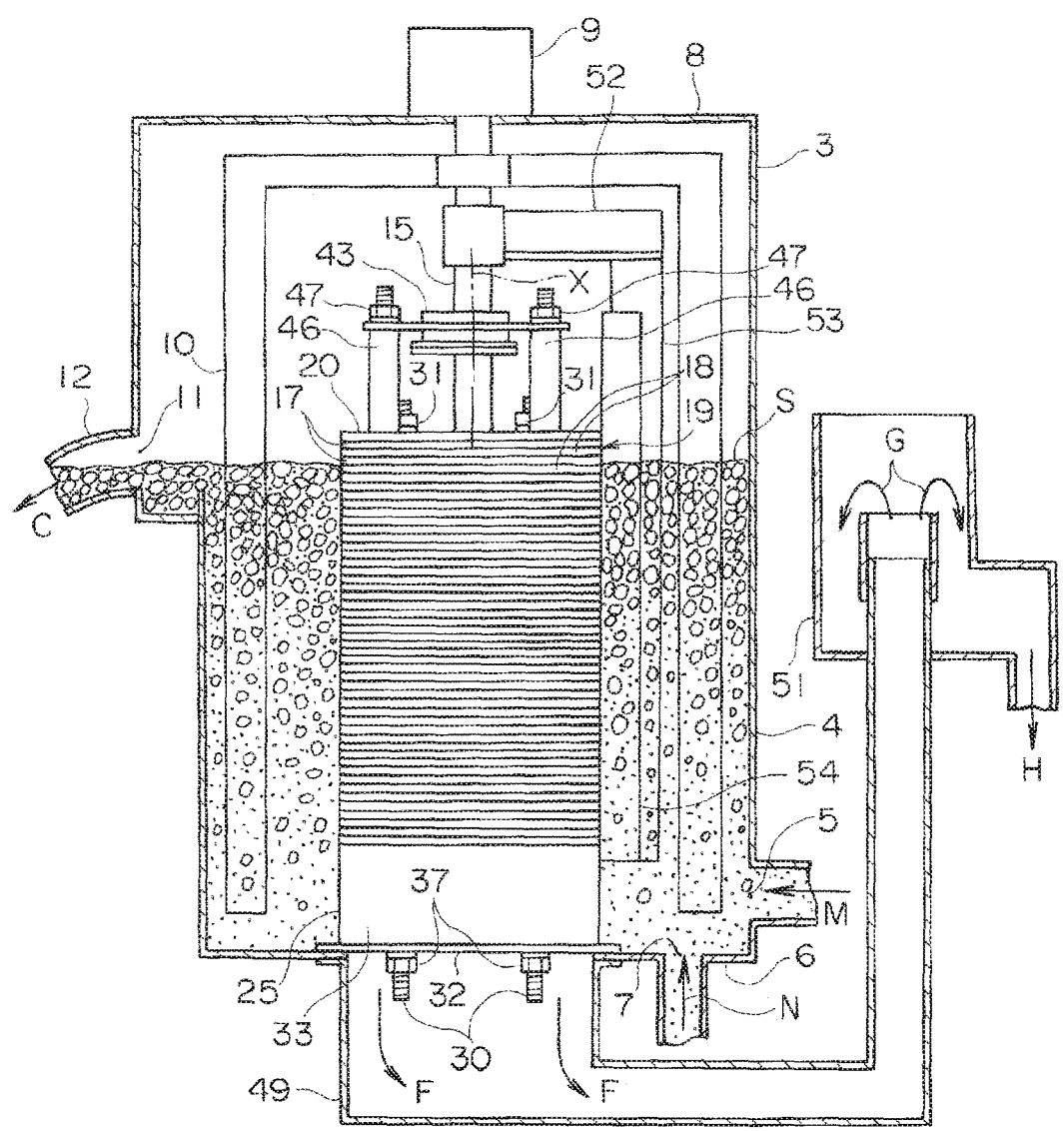
FIG. 1 is a partial cross-sectional diagram showing the entire device for concentrating object to be treated.

An embodiment of the present invention is now described hereinafter in detail with reference to the drawings.

FIG. 1 is a partial cross-sectional diagram showing the entire device for concentrating object to be treated. The device for concentrating object to be treated, described herein is capable of concentrating the object to be treated, described above as well as the other types of object to be treated; however, the following describes a process of concentrating sludge having a high water content.

The device for concentrating object to be treated, shown in FIG. 1 has a mixing tank 3. In a side wall 4 of the mixing tank 3 there is formed a sludge inlet 5 through which sludge with a high water content flows into the mixing tank 3. In a bottom wall 6 of the mixing tank 3 there is formed a flocculant inlet 7 into which a flocculant flows. A motor 9 with a reduction gear, an example of the drive unit, is secured and supported on an upper wall 8 of the mixing tank 3. The upper end of a shaft 15 extending vertically in the mixing tank 3 is secured and coupled to an output shaft of the motor 9 (not shown), in which the base end of the upper portion of a stirring blade 10 in the mixing tank 3 is secured to the shaft 15. The shaft 15 is driven to rotate about a central axial line X thereof by the actuation of the motor 9, thereby driving to rotate the stirring blade 10 about a central axial line X thereof A filter body 19, described hereinafter in detail, is provided inside the mixing tank 3. The shaft 15 extends inside the filter body 19, and the stirring blade 10 is provided outside the filter body 19.

As shown by the arrow M in FIG. 1, the sludge with a high water content is fed into the mixing tank 3 though the sludge inlet 5. The water content of the sludge is approximately 99%, for example. A flocculant comprising a high-molecular flocculant, for example, is fed into the mixing tank 3 through the flocculant inlet 7, as shown by the arrow N. The sludge and flocculant that are fed into the mixing tank 3 in this manner are mixed and stirred by the stirring blade 10 that is driven to rotate by the motor 9. As a result, the sludge becomes flocculated. In FIG. 1, such sludge is indicated with an alphabet "S." The stirring blade 10, therefore, functions to stir the sludge and flocculant that are fed into the mixing tank 3, configuring an example of the stirring means. Note that the diagrams other than FIG. 1 do not show the sludge.

In addition to the mixing tank 3 of FIG. 1, another mixing tank, not shown, can also be configured to stir and mix sludge with a flocculant into flocculated sludge. This flocculated sludge can be fed into the mixing tank 3 through the sludge inlet 5 shown in FIG. 1 and stirred by the rotating stirring blade 10. Even when concentrating an object to be treated that does not need to be flocculated by mixing a flocculant therein, such object to be treated is fed into the mixing tank 3 through the sludge inlet 5 and stirred by the stirring blade 10.

As described above, the device for concentrating object to be treated in the present embodiment is equipped with the mixing tank 3 that accommodates the filter body 19 and receives sludge, an example of the object to be treated, containing liquid, the stirring means that is disposed outside the filter body 19 and stirs the object to be treated, fed into the mixing tank 3, the shaft 15 extending inside the filter body 19, and the motor 9, an example of the drive unit that rotationally drives the shaft 15.

The sludge S, flocculated in a manner described above, flows out of the mixing tank 3 through an outlet 11, as shown by the arrow C in FIG. 1, and is transferred to a solid-liquid separator, not shown, through a conduit 12, where solid-liquid separation is performed on the sludge S. Specific configurations and effects for separating sludge into a solid and liquid have been well-known; thus, the explanation thereof is omitted herein. The solid-liquid separator described in, for example, Japanese Patent Application Laid-open No. H5-228695 or Japanese Patent Application Laid-open No. 2004-357615 can be widely used as the solid-liquid separator of the present invention.

FIGS. 2 and 3 are each an enlarged vertical cross-sectional diagram showing the filter body 19 and configurations associated therewith. As shown in these diagrams, the filter body 19 has a plurality of fixed plates 17 that are disposed vertically at intervals with a plurality of small, ring-shaped spacers 29 therebetween, and movable plates 18 disposed between adjacent fixed plates 17. As shown in the illustrated example, one movable plate 18 is disposed between adjacent fixed plates 17. However, a plurality of movable plates 18 can be disposed between two adjacent fixed plates 17. Alternatively, the spacers 29 can be integrated with one fixed plate 17 into a single piece. In the device for concentrating object to be treated of the present embodiment, a guide plate 20 is disposed on top of the filter body 19, and a seating 25 is provided underneath the filter body 19. The guide plate 20 and the seating 25 are described hereinafter in detail.

FIG. 4 is an exploded perspective view showing two, vertically adjacent fixed plates 17, one movable plate 18 disposed between these fixed plates 17, the guide plate 20 described above, and some components associated with these plates. FIG. 5 is a perspective view for clarifying the internal structure of the filter body 19 and the configurations associated therewith without showing the fixed and movable plates positioned in the lower portion of the filter body 19 as well as the guide plate and the like. FIGS. 6 to 9 are each a schematic plan view that clarifies the positional relationship between a movable plate 18 and a fixed plate 17 by showing the movable plate 18 with a two-dot chain line and clarifies the movements of the movable plate 18 and a cleaning member 54 described hereinafter without showing the guide plate and the like, for the purpose of clarification.

As shown in FIGS. 4 to 6, the fixed plates 17 each have a through-hole 21, and an outer circumferential surface 22 of each fixed plate 17 is formed into a circle. The movable plates 18 each have a through-hole 23. The through-holes 21, 23 of the fixed plates 17 and the movable plates 18 may be in any shapes such as circles, polygons, ellipses, and the like, and an outer circumferential surface 24 of each movable plate 18 may also be in any shapes such as polygons and ellipses in addition to circles, but the fixed plates 17 and the movable plates 18 of the present embodiment are formed into rings, as shown in FIGS. 4 and 6, in which the through-hole 21 of each fixed plate 17 is formed into a circle concentric with the circular outer circumferential surfaces 22, and the through-hole 23 and outer circumferential surface 24 of each movable plate 18, too, are formed into concentric circles. However, as will be described hereinafter, a projection 27 is formed in each fixed plate 17, and two projections 60 are formed in each movable plate 18. In the device for concentrating object to be treated of the present embodiment, all of the plurality of fixed plates 17 are disposed vertically in a concentric manner, and the plurality of movable plates 18 are also disposed vertically in a concentric manner.

As shown in FIGS. 2 and 3, the through-holes 21, 23 of the plurality of fixed plates 17 and movable plates 18 formed in a manner described above define a space inside the filter body 19, in which the shaft 15 extends perpendicularly in the vertical direction without touching the filter body 19. Also as shown in FIG. 10, the shaft 15 also passes through a central hole 61 formed in the guide plate 20. As is clear from FIG. 6, in the illustrated example the central axial line X of the shaft 15 matches the central axial line of the circular through-holes 21 of the fixed plates 17, although the position of the shaft 15 relative to the fixed plates 17 and movable plates 18 can be set accordingly. The central axial line of the outer circumferential surfaces 22 of the fixed plates 17 also matches the central axial line X of the shaft 15.

As shown in FIGS. 4 and 6, each of the fixed plates 17 is configured with an annular portion 26 and a plurality of (four, in the example illustrated in each diagrams) projections 27 that protrude radially inward from the annular portion 26, forming a ring as a whole. Each of the projections 27 has a mounting hole 28. Stay bolts 30 are inserted into these mounting holes 28 and central holes of the small, ring-shaped spacers 29 disposed between adjacent fixed plates 17, as shown in FIGS. 2 to 6. Further, as shown in FIGS. 2, 3 and 10, the plurality of stay bolts 30 also pass through mounting holes 55 formed in the guide plate 20 (FIG. 4), and nuts 31 are threaded to male screws formed in the upper portions of the stay bolts 30 and tightened. Although the annular portions 26 of the fixed plates 17 shown in the diagrams are each formed into a circular ring, the shape of the annular portions 26 can be other than a form of a circular ring by shaping each through-hole 21 into a shape other than a circle.

FIG. 11 is a cross-sectional diagram of the seating 25 described above. As is clear from this diagram as well as FIGS. 1 to 3 and FIG. 5, the seating 25 is configured with a base plate 32 and a tubular body 33 secured integrally to the base plate 32, wherein the base plate 32 is secured to the bottom wall 6 of the mixing tank 3. A bearing 34 is secured to the center of the base plate 32. The lower portion of the shaft 15 is engaged rotatably with the bearing 34. Moreover, a plurality of openings 35 are formed in and penetrate the base plate 32 to let after-mentioned filtrate flow out. These openings 35 fit a filtrate passage hole 36 formed in the bottom wall 6 of the mixing tank 3.

The stay bolts 30 pass through holes 62 formed in the tubular body 33 of the seating 25 and extend downward, and nuts 37 are threaded to male screws formed in the lower portions of the stay bolts 30 and tightened. The plurality of fixed plates 17 that are arranged vertically at intervals with the spacers 29 therebetween, the guide plate 20, and the seating 25 are integrally secured and coupled together and then secured to the mixing tank 3. However, the fixed plates 17 can be assembled so as to be freely movable relative to one another.

As shown in FIGS. 1 to 3, a drainage pipe 49 is located in alignment with the filtrate passage hole 36 of the bottom wall 6 of the mixing tank 3 and secured to the bottom wall 6.

As shown in FIGS. 2 to 6, the movable plates 18 between adjacent fixed plates 17 are disposed so as to be able to operate horizontally between the annular portions 26 of the adjacent fixed plates 17. Moreover, each of the movable plates 18 is positioned outside the spacers 29 in the radial direction of the fixed plates, as shown in FIG. 6.

As shown in FIGS. 2, 3, 5 and 6, an eccentric cam 38 with a circular outer circumferential surface 39 is secured above the filter body 19 at the upper portion of the shaft 15 so as to be able to rotate integrally with the shaft 15. For example, a key groove, not shown, is formed in the shaft 15, and the eccentric cam 38 is secured in a detachable manner to the shaft 15 via a key, also not shown, which is engaged with the key groove. As shown in FIG. 2 and FIGS. 6 to 9, a central axial line Y of the eccentric cam 38 is off the central axial line X of the shaft 15 by a distance indicated with δ.

Instead of configuring the eccentric cam 38 and the shaft 15 as different members and securing these members in a manner described above, the eccentric cam 38 and the shaft 15 can be formed integrally into a single piece.

A circular inner circumferential surface 40 of a ring-shaped slide bearing 42 that is concentric with its circular outer circumferential surface 41 is engaged with the circular outer circumferential surface 39 of the eccentric cam 38, and the circular outer circumferential surface 41 of the slide bearing 42 is engaged with a circular hole 44 of a coupling plate 43. In the example illustrated here, the entire periphery of the circular outer circumferential surface 39 of the eccentric cam 38 is engaged with the circular inner circumferential surface 40 of the slide bearing 42 so as to be able to slide directly on the circular inner circumferential surface 40 or with a lubricant therebetween. The slide bearing 42 and the coupling plate 43 may be secured to each other with, for example, a bolt or nut, not shown, or the coupling plate 43 and the slide bearing 42 may be engaged with each other in a relatively rotatable manner. The slide bearing 42 is made of a material with low friction coefficient, such as resin, for example.

In the illustrated example, an eccentric cam 138, a slide bearing 142, and a coupling plate 143 that are configured in the same manner as the eccentric cam 38, the slide bearing 42, and the coupling plate 43, which are explained in the above paragraph, are provided below the filter body 19 at the lower portion of the shaft 15, as shown in FIGS. 2 and 3. The eccentric cams 38, 138 share the same central axial line Y and have the same eccentricity δ with respect to the central axial line X of the shaft 15.

As shown in FIGS. 2, 5 and 6, two mounting holes 45 and two mounting holes 145 are formed in the coupling plates 43, 143 respectively. Also, as shown in FIGS. 4 and 6, each of the movable plates 18 is configured with an annular portion 63 and the foregoing projections 60 protruding radially inward from the annular portion 63, forming a ring as a whole. Furthermore, a mounting hole 50 is formed in each of the projections 60. As shown in FIG. 10, guide holes 48, described hereinafter, are formed in the guide plate 20.

The annular portions 63 of the movable plates 18 of the present embodiment are each formed into a circular ring; however, the shape of the annular portions 63 can be other than a form of a circular ring. Instead of forming the projections 60 in the movable plates 18, the movable plates 18 can be configured only with the annular portions 63.

Coupling rods 46 that extend in parallel with the central axial line X of the shaft 15 pass through the foregoing mounting holes 45, 145, 50 and guide holes 48, and nuts 47, 147 are threaded to male screws formed in the longitudinal ends of the coupling rods 46 and tightened. In this manner, the plurality of movable plates 18 are coupled integrally to one another by the coupling rods 46, and these coupling rods 46 are coupled integrally to the coupling plates 43, 143. As shown in FIGS. 2 and 3, a small filtrate inflow gap g of approximately, for example, 0.1 mm to 1 mm is formed between each fixed plate 17 and each movable plate 18. As shown in FIG. 10, the diameter of the guide holes 48 formed in the guide plate 20 is greater than that of the coupling rods 46. The relationship between the coupling rods 46 and the guide holes 48 is described hereinafter in detail.

In the illustrated example, the plurality of movable plates 18 are secured and coupled by the coupling rods 46, and the coupling rods 46 are secured and coupled to the coupling plates 43, 143, as described above. However, the coupling rods 46 and each movable plate 18 can be coupled with a slight amount of play therebetween, or the coupling plates 43, 143 can be coupled to the coupling rods 46 with a slight amount of play therebetween. In addition, three or more coupling rods can be provided.

The positions of the movable plates 18 relative to the eccentric cam 38 can be set accordingly, and, for this reason, the position of the central axial line of the through-holes 23 of the respective movable plates 18 relative to the central axial line Y of the eccentric cams 38, 138 can be set accordingly. In the device for concentrating object to be treated of the present embodiment, however, the positions of the movable plates 18 and the positions of the eccentric cams 38, 138 are set in such a manner that the central axial line of the circular through-holes 23 of the respective movable plates 18 matches the central axial line Y of the eccentric cams 38, 138. Thus, the central axial line of the through-hole 23 of each movable plate 18 is indicated with an alphabet "Y," as shown in FIGS. 6 to 9.

As described above, the sludge and flocculant are fed into the mixing tank 3, at which moment the stirring blade 10 is driven to rotate by the motor 9 to stir the sludge and flocculant, flocculating the sludge. At this moment, because the filter body 19 is disposed inside the mixing tank 3 and the small filtrate inflow gaps g shown in FIGS. 2 and 3 are formed between the fixed plates 17 and movable plates 18 of the filter body 19, the water content of the flocculated sludge in the mixing tank 3 flows into the filter body 19 through the filtrate inflow gaps g. The width of the filtrate inflow gaps g is set so as to prevent passage of flocs.

As described above, the water content that flows into the filter body 19 through the filtrate inflow gaps g between the fixed plates 17 and the movable plates 18, i.e., the filtrate, flows downward in the filter body 19 with the force of gravity and then flows into the drainage pipe 49 through the openings 35 formed in the seating 25 and the filtrate passage hole 36 formed in the bottom wall 6 of the mixing tank 3, as shown by the arrows F in FIG. 1. Subsequently, this filtrate flows out of the drainage pipe 49, as shown by the arrows G in FIG. 1, is received by a filtrate receiving member 51, and then flows downward as shown by the arrow H. Letting the filtrate, which is separated from the object to be treated and fed to the mixing tank 3, flow into the filter body 19 through the filtrate inflow gaps g between the fixed plates 17 and the movable plates 18, the resultant object to be treated with a reduced liquid content can be allowed to flow out of the outlet 11 of the mixing tank 3 and efficiently separated into a solid and liquid by the solid-liquid separator. Note that the filtrate is not shown in any of the diagrams.

As described above, when the motor 9 shown in FIG. 1 is activated and consequently the shaft 15 rotates about its central axial line X in the direction shown by the arrow P in FIGS. 5 to 9, the eccentric cams 38, 138 rotate, with the central axial line Y thereof drawing a circle with a radius equivalent to the eccentricity δ around the central axial line X of the shaft 15, as shown by the arrow E in FIGS. 6 to 9. At this moment, because the circular outer circumferential surfaces 39, 139 of the eccentric cams 38, 138 are engaged with the circular inner circumferential surfaces 40, 140 of the slide bearings 42, 142 in a slidable manner and the plurality of movable plates 18 are coupled integrally to one another by the coupling rods 46 and the coupling plates 43, 143, the foregoing rotary motion of the eccentric cams 38, 138 causes the plurality of movable plates 18 to move in a circle with a radius equivalent to the eccentricity δ of the eccentric cams 38, 138.

In the illustrated example, the central axial line Y of the eccentric cams 38, 138 matches the central axial line Y of the through-holes 23 of the movable plates 18. For this reason, when the central axial line Y of the eccentric cams 38, 138 rotates about the central axial line X of the shaft 15 in the direction of the arrow E, drawing a circle with a radius equivalent to the eccentricity δ, the plurality of movable plates 18 that are coupled to one another also move in a circle, with the central axial line Y of the respective through-holes 23 drawing a circle with a radius equivalent to the eccentricity δ around the central axial line X of the shaft 15, in an order shown in FIGS. 6 to 9.

As described above, the movable plates 18 move in a circle, while the fixed plates 17 are kept immovable. Therefore, the solid content of the sludge entering the filtrate inflow gaps g between the adjacent movable and fixed plates 18 and 17 can be scraped off, preventing clogging of the filtrate inflow gaps g by the solid content.

The ring-shaped slide bearings 42, 142 engaged with the circular outer circumferential surfaces 39, 139 of the eccentric cams 38, 138, the coupling plates 43, 143 that have the circular holes 44, 144 engaged with the circular outer circumferential surfaces 41, 141 of the slide bearings 42, 142, and the coupling rods 46 that couple the plurality of movable plates 18 to one another and are coupled to the coupling plates 43, 143, configure an example of the coupling means for coupling the plurality of movable plates 18 to the eccentric cams 38, 138 in such a manner that the plurality of movable plates 18 move in a circle with a radius equivalent to the eccentricity δ of the eccentric cams 38, 138.

According to this configuration, in the device for concentrating object to be treated of the present embodiment, the entire peripheries of the circular outer circumferential surfaces 39, 139 of the eccentric cams 38, 138 are engaged with the circular inner circumferential surfaces 40, 140 of the slide bearings 42, 142 so as to be able to slide directly on the circular inner circumferential surfaces 40, 140 or with a lubricant therebetween, as described above. Due to this configuration, the external forces that act on the circular outer circumferential surfaces 39, 139 of the eccentric cams 38, 138 and the circular inner circumferential surfaces 40, 140 of the slide bearings 42, 142 are dispersed, reducing the pressure per unit area that acts on these circumferential surfaces, and consequently reducing wear loss of the eccentric cams 38, 138 and of the slide bearings 42, 142.

Even with the configuration in which the entire peripheries of the circular outer circumferential surfaces 41, 141 of the slide bearings 42, 142 are engaged with the inner circumferential surfaces of the circular holes 44, 144 of the coupling plates 43, 143 so as to be able to slide directly on the inner circumferential surfaces of the circular holes 44, 144 or with a lubricant therebetween, the movable plates 18 can be moved in a circle in exactly the same way as they can be as described above, and wear loss of the circular outer circumferential surfaces 41, 141 of the slide bearings 42, 142 and of the inner circumferential surfaces of the circular holes 44, 144 of the coupling plates 43, 143 can be reduced. In this case, the circular outer circumferential surfaces 39, 139 of the eccentric cams 38, 138 and the circular inner circumferential surfaces 40, 140 of the slide bearings 42, 142 may be secured to each other or engaged with each other in a slidable manner.

Alternatively, the slide bearings 42, 142 can be omitted altogether. In such a case, the coupling means for coupling the movable plates 18 to the eccentric cams 38, 138 in a manner described above is configured by the coupling plates 43, 143 having the circular holes 44, 144 engaged with the circular outer circumferential surfaces 39, 139 of the eccentric cams 38, 138 and the coupling rods 46 that couple the plurality of movable plates 18 to one another and are coupled to the coupling plates 43, 143, wherein the eccentric cams themselves are each made of a material with low friction coefficient, such as resin, for example. Moreover, in such a case, because the entire peripheries of the circular outer circumferential surfaces 39, 139 of the eccentric cams 38, 138 are engaged with the inner circumferential surfaces of the circular holes 44, 144 of the coupling plates 43, 143 so as to be able to slide directly on the inner circumferential surfaces of the circular holes 44, 144 or with a lubricant therebetween, wear loss of the circular outer circumferential surfaces 39, 139 of the eccentric cams 38, 138 and of the inner circumferential surfaces of the circular holes 44, 144 of the coupling plates 43, 143 can be kept low.

The device for concentrating object to be treated of the present embodiment is provided with two eccentric cams, two slide bearings, and two coupling plates but can be provided with three or more of these members. The eccentric cams 38, 138 and the coupling plates 43, 143 can be provided at a plurality of sections separated from each other in the longitudinal direction of the shaft 15, and the coupling rods 46 can be coupled to the plurality of coupling plates 43, 143. The plurality of movable plates 18 can securely be coupled to one another and moved in a circle by providing the plurality of eccentric cams and coupling plates as described above; however, secure coupling and secure circular motion of the movable plates 18 can also be realized with one eccentric cam, one slide bearing, and one coupling plate.

In order to prevent, more reliably, clogging of the filtrate inflow gaps g between the movable plates 18 and the fixed plates 17 by the solid content by taking advantage of the circular motion of the movable plates 18, it is preferred that the fixed plates 17 and the movable plates 18 be formed in such a manner that each of the movable plates 18 moves in a circle while moving in the entire space between the annular portions 26 of adjacent fixed plates 17 during one rotation of the shaft 15, as is clear from FIGS. 6 to 9. According to this configuration, because each movable plate 18 always passes through the space between the annular portions 26 of adjacent fixed plates 17 while the shaft 15 rotates once, a solid matter that enters the filtrate inflow gaps g can always be scraped off, effectively preventing clogging of the filtrate inflow gaps g by the solid content of the sludge.

As shown in FIGS. 6 to 9, in the device for concentrating object to be treated of the present embodiment, the fixed plates 17 and the movable plates 18 are formed into rings, the central axial line Y of the circular through-holes 23 of the respective movable plates 18 matches the central axial line Y of the eccentric cams 38, 138, and the central axial line of the circular through-holes 21 of the respective fixed plates 17 matches the central axial line X of the shaft 15. According to this configuration, as shown in FIG. 6, the fixed plates 17 and the movable plates 18 are formed in such a manner that $a+\delta \leq B$ and $A+\delta \geq b$ are satisfied, as is clear from FIGS. 6 to 9, where a represents the radius of the through-hole 23 of each movable plate 18, A represents the radius of the outer circumferential surface 24 of each movable plate 18, b represents the radius of the through-hole 21 of each fixed plate 17, B represents the radius of the outer circumferential surface 22 of each fixed plate 17, and $\delta$ represents the eccentricity of the central axial line Y of the eccentric cams 38, 138 with respect to the central axial line X of the shaft 15. Accordingly, each of the movable plates 18 can move in a circle while moving in the entire space between the annular portions 26 of adjacent fixed plates 17 during one rotation of the shaft 15. Note that the radiuses b, a of the through-holes 21, 23 of the fixed plates 17 and the movable plates 18 indicate the radiuses of the through-holes 21, 23 of the annular portions 26, 63 of the fixed plates 17 and the movable plates 18 excluding the projections 27, 60.

Although the circular motion of the movable plates 18 can prevent clogging of the filtrate inflow gaps g by the solid content of the sludge as described above, it becomes impossible to efficiently let the water content of the sludge flow into the filter body 19 if the solid content adheres to the periphery of the filter body 19.

In the device for concentrating object to be treated of the present embodiment, therefore, the base end of an arm 52 extending in the radial direction of the shaft 15 is secured to the shaft 15, the upper end of a supporting plate 53 extending vertically is fixed to the edge of the arm 52, and the cleaning member 54 extending vertically is secured to the supporting plate 53, as shown in FIGS. 1, 2 and 5. The cleaning member 54 that is exemplified in the diagrams is in the form of a blade made of, for example, resin. As shown in FIGS. 6 to 9, an edge 70 of the cleaning member 54 facing the fixed plates 17 is in slight contact with the outer circumferential surfaces 22 of the fixed rings 17. As shown in FIG. 6, the distance R between the central axial line X of the shaft 15 and the edge 70 of the cleaning member 52 is equivalent to the radius B of the outer circumferential surface 22 of each fixed ring.

The cleaning member 54 is secured and supported on the shaft 15 by the supporting plate 53 and the arm 52, as described above. Therefore, when the shaft 15 is driven by the motor 9 to rotate in the direction of the arrow P, the cleaning member 54 synchronously rotates about the central axial line X of the shaft 15, along with the shaft 15, as shown in FIGS. 6 to 9. In so doing, the cleaning member 54 rotates along with the shaft 15 while in sliding contact with the parts of the outer circumferential surfaces 22 of the plurality of fixed plates 17 where the movable plates 18 do not protrude outward from the outer circumferential surfaces 22 of the fixed plates 17 in the radial direction of the fixed plates 17, as is clear from FIGS. 3, 5, and FIGS. 6 to 9. The cleaning member 54 is secured and supported on the shaft 15 so as to be able to move in this manner. Owing to this configuration, the cleaning member 54 can come into sliding contact with the outer circumferential surfaces 22 of the plurality of fixed plates 17 to securely scrape off the hydrous solid content adhering to the outer circumferential surfaces 22, without being interrupted by the circularly moving movable plates 18. Therefore, adhesion of a large amount of solid content to the periphery of the filter body 19 can be prevented. Consequently, the filtrate separated from the sludge can efficiently flow into the filter body 19.

As described in Japanese Patent No. 4318735, the cleaning member can be configured with a pipe, a cylindrical rod, a square rod, a brush or the like.

In the device for concentrating object to be treated of the present embodiment described above, because the movable plates 18 are configured to move in a circle as the shaft 15 rotates, the movable plates are not shoved by the rotating cleaning member, unlike the conventional device for concentrating object to be treated. For this reason, the cleaning member 54 is not subjected to high pressure from the movable plates 18 but simply comes into slight contact with the outer circumferential surfaces 22 of the fixed plates 17. Therefore, unlike the conventional device for concentrating object to be treated, the cleaning member 54 or each movable plate 18 does not wear quickly, and the lives of these members can be lengthened.

Now, when the movable plates 18 move in a circle along with the coupling rods 46 and the coupling plates 43, 143, the coupling plates 43, 143, the coupling rods 46, and the movable plates 18 are caused to rotate about the central axial line X of the shaft 15 (autorotation) in the direction shown by the arrow I in FIG. 6 by the external forces applied to the coupling plates 43, 143 by the eccentric cams 38, 138, bringing the movable plates 18 into contact with the spacers 29 and possibly damaging the movable plates 18 and the spacers 29.

The device for concentrating object to be treated of the present embodiment is provided with the guide plate 20 shown in FIGS. 2 to 4 and FIG. 10, as briefly described earlier. The guide plate 20 is secured to the fixed plates 17 by the stay bolts 30 and the nuts 31, 37 and has the guide holes 48 through which the coupling rods 46 pass, the guide holes 48 having a diameter larger than that of the coupling rods 46. When the coupling rods 46 move in a circle along with the movable plates 18 as described above, the coupling rods 46 are guided while in sliding contact with the inner circumferential surfaces of the guide holes 48 and therefore are prevented from rotating in the direction shown by the arrow I in FIG. 6. The guide plate 20, therefore, configures an example of the guide that guides the movable plates 18 that move in a circle, for the purpose of preventing the movable plates 18 from coming into contact with the other members, such as the spacers 29 in this example, by rotating about the central axial line X of the shaft 15 in the direction of the arrow I.

The number of guide plates 20 may be one, as in the illustrated example, but a plurality of guide plates can be provided at different locations along the direction of the axial line of the shaft 15.

In the foregoing device for concentrating object to be treated, the fixed plates 17 of the filter body 19 are arranged in the vertical direction and the central axial line X of the shaft 15 extends vertically, but the filter body 19 can be disposed in such a manner that the central axial line X tilts.

The device for concentrating object to be treated may be configured in such a manner that the filtrate that flows into the filter body 19 can flow to the outside through the lower portion of the filter body 19 by its own weight.

A preferred embodiment of the present invention was described above, but the present invention is not limited to the configuration of the embodiment and can be realized in various modifications.

REFERENCE NUMERALS

3 Mixing tank
11 Outlet
15 Shaft
17 Fixed plate
18 Movable plate
19 Filter body
21, 23 Through-hole
22, 24 Outer circumferential surface
26 Annular portion
38, 138 Eccentric cam
39, 139 Circular outer circumferential surface
40, 140 Circular inner circumferential surface
41, 141 Circular outer circumferential surface
42, 142 Slide bearing
43, 143 Coupling plate
44, 144 Circular hole
46 Coupling rod
54 Cleaning member
g Filtrate inflow gap
X, Y Central axial line
δ Eccentricity

The invention claimed is:

1. A device for concentrating a fluid mixture including a liquid and solids, the device, comprising:
a filter body having a plurality of fixed plates, each of the fixed plates having a through-hole and a circular outer circumferential surface, the plurality of fixed plates disposed at intervals, and having movable plates, each of the movable plates having a through-hole and disposed between adjacent fixed plates;
a mixing tank accommodating the filter body, the fluid mixture being fed to the mixing tank;
a stirrer disposed outside the filter body and stirring the fluid mixture, fed to the mixing tank;
a shaft extending in the filter body;
a drive unit rotationally driving the shaft;
an eccentric cam secured to the shaft or formed integrally with the shaft and eccentrically disposed with respect to a central axial line of the shaft;
a coupler for coupling the plurality of movable plates and the eccentric cam to each other so that the plurality of movable plates move in a circle, with an eccentricity of the eccentric cam being a radius of the circle; and
a cleaning member secured and supported on the shaft so as to rotate along with the shaft while in sliding contact with parts of outer circumferential surfaces of the plurality of fixed plates where the movable plates do not protrude outward from the outer circumferential surfaces of the fixed plates in a radial direction of the fixed plates,
wherein filtrate that is separated from the fluid mixture fed to the mixing tank is made to flow into the filter body through filtrate inflow gaps between the fixed plates and the movable plates, and the resultant fluid mixture with a reduced liquid content is made to flow out of the mixing tank through an outlet.

2. The device as recited in claim 1 wherein the coupler has a ring-shaped slide bearing engaged with a circular outer circumferential surface of the eccentric cam, a coupling plate having a circular hole engaged with a circular outer circumferential surface of the slide bearing, and a coupling rod coupling the plurality of movable plates and coupled to the coupling plate, and an entire periphery of the circular outer circumferential surface of the eccentric cam being engaged with a circular inner circumferential surface of the slide bearing in a slidable manner.

3. The device as recited in claim 1 wherein a further eccentric cam and a further coupling plate are provided at a further section in a longitudinal direction of the shaft, and the coupling rod is coupled to the coupling plate and further coupling plate.

4. The device as recited in claim 1 wherein the coupler has a ring-shaped slide bearing engaged with a circular outer circumferential surface of the eccentric cam, a coupling plate having a circular hole engaged with a circular outer circumferential surface of the slide bearing, and a coupling rod coupling the plurality of movable plates and coupled to the coupling plate, and an entire periphery of the circular outer circumferential surface of the slide bearing being engaged with an inner circumferential surface of the circular hole formed in the coupling plate in a slidable manner.

5. The device as recited in claim 4 wherein a further eccentric cam and a further coupling plate are provided at a further section in a longitudinal direction of the shaft, and the coupling rod is coupled to the coupling plate and further coupling plate.

6. The device as recited in claim 1 wherein the coupler has a coupling plate having a circular hole engaged with a circular outer circumferential surface of the eccentric cam, and a coupling rod coupling the plurality of movable plates and coupled to the coupling plate, and an entire periphery of the circular outer circumferential surface of the eccentric cam being engaged with an inner circumferential surface of the circular hole formed in the coupling plate in a slidable manner.

7. The device as recited in claim 6 wherein a further eccentric cam and a further coupling plate are provided at a further section in a longitudinal direction of the shaft, and the coupling rod is coupled to the coupling plate and further coupling plate.

8. The device as recited in claim 1 wherein the fixed plates and the movable plates are formed in such a manner that the movable plates move in a circle while moving in an entire space between annular portions of adjacent fixed plates during one rotation of the shaft.

9. The device as recited in claim 8 wherein the fixed plates and the movable plates are formed in a ring shape, a central axial line of circular through-holes of the movable plates matches a central axial line of the eccentric cam, a central axial line of circular through-holes of the fixed plates matches a central axial line of the shaft, and the fixed plates and the movable plates are formed in such a manner that $a+\delta \leq B$ and $A+\delta \geq b$ are satisfied, where a represents a radius of the through-holes of the movable plates, A represents a radius of outer circumferential surfaces of the movable plates, b represents a radius of the through-holes of the fixed plates, B represents a radius of outer circumferential surfaces of the fixed plates, and δ represents an eccentricity of the central axial line of the eccentric cam with respect to the central axial line of the shaft.

10. The device as recited in claim 1 further comprising a guide for guiding the movable plates moving in a circle so that the movable plates are prevented from coming into contact with other members by rotating about the central axial line of the shaft.

* * * * *